United States Patent
Tsuchimoto

(10) Patent No.: US 10,853,715 B2
(45) Date of Patent: Dec. 1, 2020

(54) WIRELESS TAG WRITING DEVICE AND WIRELESS TAG WRITING METHOD

(71) Applicant: TOSHIBA TEC KABUSHIKI KAISHA, Shinagawa-ku, Tokyo (JP)

(72) Inventor: Hiroshi Tsuchimoto, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/421,510

(22) Filed: May 24, 2019

(65) Prior Publication Data

US 2019/0370623 A1 Dec. 5, 2019

(30) Foreign Application Priority Data

Jun. 1, 2018 (JP) .................. 2018-105937

(51) Int. Cl.
| | |
|---|---|
| *G06K 19/07* | (2006.01) |
| *G06K 7/00* | (2006.01) |
| *G06K 17/00* | (2006.01) |
| *G06K 19/077* | (2006.01) |

(52) U.S. Cl.
CPC ....... *G06K 19/0723* (2013.01); *G06K 7/0008* (2013.01); *G06K 17/0025* (2013.01); *G06K 19/07718* (2013.01); *G06K 19/07796* (2013.01)

(58) Field of Classification Search
CPC .... G06K 1/20; G06K 7/0008; G06K 17/0025; G06K 19/07718; B41J 3/50
See application file for complete search history.

(56) References Cited

U.S. PATENT DOCUMENTS

| | | |
|---|---|---|
| 9,384,377 B2 | 7/2016 | Yamamoto |
| 2006/0109496 A1 | 5/2006 | Brown et al. |
| 2008/0074267 A1 | 3/2008 | Sugiyama |
| 2009/0189770 A1 | 7/2009 | Wirrig et al. |
| 2013/0015959 A1 | 1/2013 | Sano |
| 2014/0035733 A1 | 2/2014 | Yamamoto |

(Continued)

FOREIGN PATENT DOCUMENTS

JP 2013-020502 1/2013

OTHER PUBLICATIONS

Extended European Search Report for European Patent Application No. 19176692.2 dated Oct. 14, 2019.

*Primary Examiner* — Suezu Ellis
(74) *Attorney, Agent, or Firm* — Amin, Turocy & Watson, LLP

(57) ABSTRACT

A calibration execution section (calibration module) conveys a label mount by a conveyance pitch set by a conveyance pitch setting section (setting module) based on information including an arrangement state of a plurality of label papers attached to the label mount, and determines a writing position of information to an RFID tag (wireless tag), a wireless output value at the time of writing the information, and a threshold value for discriminating between a response signal from an RFID tag which is a writing target for the wireless output value and a response signal from an RFID tag which is not the writing target. An information writing section (writing module) writes the information at the writing position determined by the calibration execution section according to the wireless output value determined by the calibration execution section.

15 Claims, 8 Drawing Sheets

(56) References Cited

U.S. PATENT DOCUMENTS

2014/0035734 A1\* 2/2014 Yamamoto ......... G06K 7/10198
340/10.51
2018/0165487 A1\* 6/2018 Hori ........................ G06K 1/20
2018/0341243 A1\* 11/2018 Oishi ................... G05B 19/128

\* cited by examiner

WIRELESS TAG WRITING DEVICE AND WIRELESS TAG WRITING METHOD

CROSS-REFERENCE TO RELATED APPLICATION

This application is based upon and claims the benefit of priority from Japanese Patent Application No. P2018-105937, filed on Jun. 1, 2018, the entire contents of which are incorporated herein by reference.

FIELD

Embodiments described herein relate generally to a wireless tag writing device and a wireless tag writing method.

BACKGROUND

Conventionally, when a writing condition for an RFID (Radio Frequency Identification) tag is determined in an RFID compatible label printer, a calibration operation for determining a correct writing position is performed by executing reading and writing of information while conveying an RFID tag actually used by a constant pitch (for example, Japanese Patent No. 5555671).

Specifically, the calibration operation is performed by moving a label mount to which a plurality of label papers with the RFID tags is attached by a constant pitch. Therefore, when the plurality of RFID tags is formed at wide intervals on the label mount, there is a problem that it takes much time to perform calibration.

DETAILED DESCRIPTION

In accordance with an embodiment, a wireless tag writing device, which writes predetermined information to wireless tags respectively formed on a plurality of label papers attached to a label mount while conveying the wireless tags, comprises a setting module configured to set a conveyance pitch for conveyance of the label mount based on information including an arrangement state of the plurality of label papers attached to the label mount; a calibration module configured to convey the label mount by the conveyance pitch set by the setting module and determine a writing position of information to the wireless tag, a wireless output value at the time of writing the information, and a threshold value for discriminating between a response signal from the wireless tag which is a writing target for the wireless output value and a response signal from a wireless tag which is not the writing target; and a writing module configured to write the information at the writing position determined by the calibration module according to the wireless output value determined by the calibration module.

First Embodiment

Hereinafter, a first embodiment of a wireless tag writing device is described in detail with reference to the accompanying drawings. The first embodiment described below is merely an example in which the wireless tag writing device is an RFID printer device.

(Description of Schematic Configuration of Printer Device)

Figure 1:
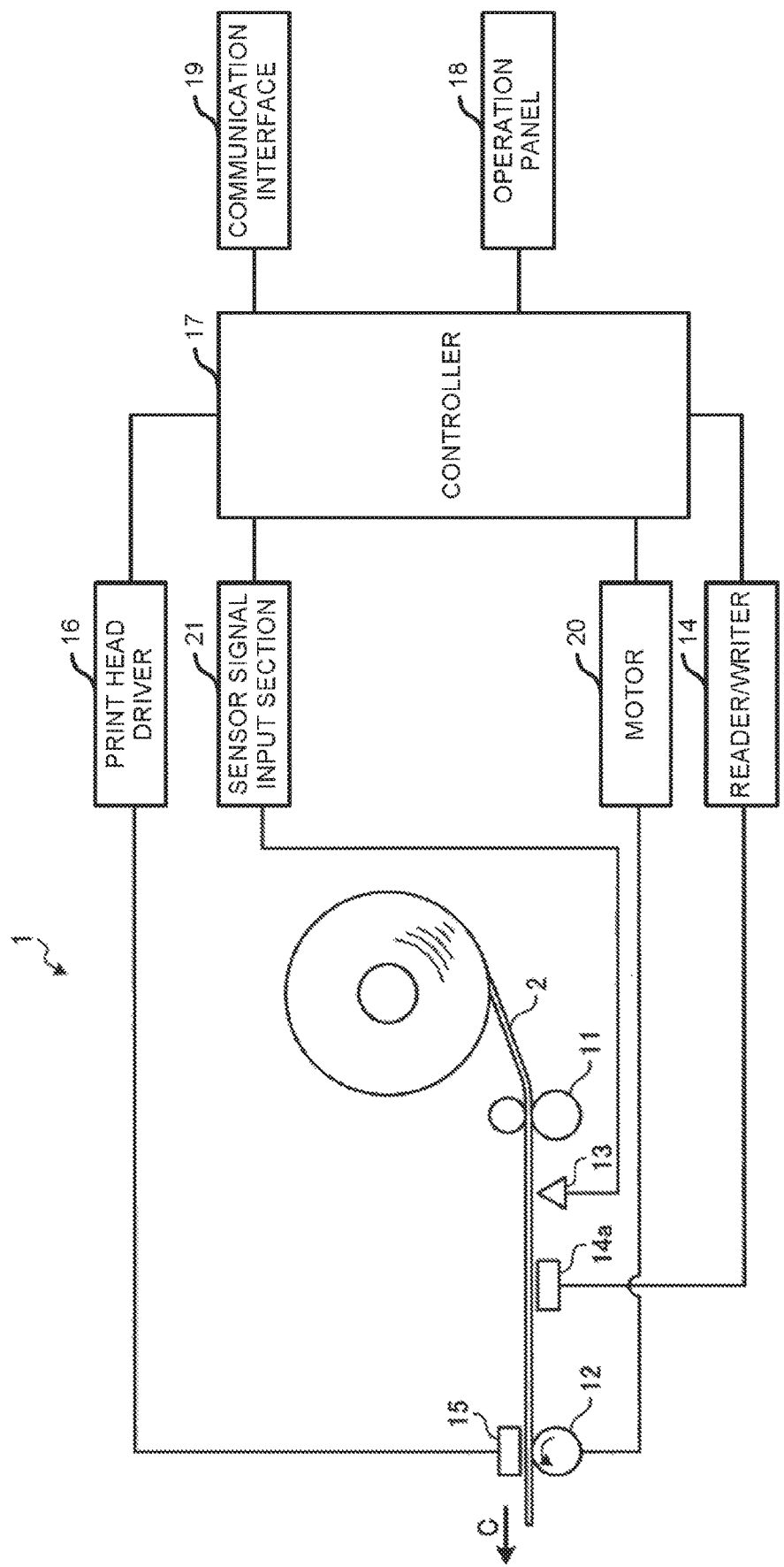
FIG. 1 is a diagram illustrating a schematic configuration of an RFID printer device according to a first embodiment.

FIG. 1 is a configuration diagram illustrating a schematic configuration of an RFID printer device 1 according to the first embodiment. The RFID printer device 1 conveys a label mount 2 formed into a roll shape and performs printing on a plurality of label papers 3 (3*a*, 3*b*, 3*c*, . . . ) (refer to FIG. 2) attached to the label mount 2 at the same time. The RFID printer device 1 writes information to RFID tags 4 (4*a*, 4*b*, 4*c*, . . . ) (refer to FIG. 2) respectively formed on the plurality of the label papers 3 (3*a*, 3*b*, 3*c*, . . . ) while conveying the label mount 2. The RFID printer device 1 is an example of a wireless tag writing device. The RFID tag 4 is an example of a wireless tag.

As shown in FIG. 1, the RFID printer device 1 conveys the label mount 2 in a direction indicated by an arrow C using a rotational driving force of a platen roller 12. Then, a conveyance roller 11, a mark sensor 13, an antenna 14*a* and a print head 15 are arranged in order along a conveyance path of the label mount 2 from an upstream side in the direction indicated by the arrow C which is a conveyance direction.

The conveyance roller 11 conveys the label mount 2 along a constant conveyance path regardless of a remaining quantity of the label mount 2.

For example, the mark sensor 13 optically detects a black mark 5 (refer to FIG. 2) indicating a reference position on the label mount 2 from a back surface side opposite to a printing surface on which the print head 15 described below performs printing. The mark sensor 13 scans a back surface of the label mount 2 conveyed along the conveyance path in the direction indicated by the arrow C, and outputs an ON signal if the mark sensor 13 detects a downstream edge of the black mark 5 in the direction indicated by the arrow C, or outputs an OFF signal if the mark sensor 13 detects an upstream edge thereof in the direction indicated by the arrow C, for example. The position of the black mark 5 and the position of the label paper 3 have a predetermined relationship. For example, in an example shown in FIG. 2 described below, the position of the upstream edge of the black mark 5 in the direction indicated by the arrow C matches the position of the downstream edge of the label paper 3. Therefore, detection of the upstream edge of the black mark 5 by the mark sensor 13 means detection of the downstream edge of the label paper 3. Thus, the position of the label paper 3 can be specified based on the detection result for the black mark 5.

The method of specifying the position of the label paper 3 is not limited thereto, and other optical sensors may be used instead of the mark sensor 13. For example, a transmission sensor may be used, which is provided on the conveyance path and includes a light receiving section provided on the printing surface side of the label paper 3 and a light emitting section provided on the side of a surface other than the printing surface. The light emitted from the light emitting section is detected by the light receiving section after penetrating the label mount 2 or the label mount 2 and the label paper 3. The intensity of light detected by the light receiving section is smaller in the case of penetrating the label mount 2 and the label paper 3 as compared with the case of only penetrating the label mount 2. Specifically, a position at which the intensity of the light detected by the light receiving section becomes large corresponds to the upstream edge of the label paper 3, and a position at which the intensity of the light detected by the light receiving section becomes small corresponds to the downstream edge of the label paper 3.

A reader/writer 14 enables the antenna 14a to emit unmodulated waves (electromagnetic waves) to perform wireless communication with the RFID tag 4. The RFID tag 4 receives the unmodulated waves and starts to return a response signal. Then, the antenna 14a receives the response signal. In this way, the reader/writer 14 communicates with the RFID tag 4.

At the time of writing information to the RFID tag 4, the reader/writer 14 modulates amplitude of the electromagnetic waves emitted from the antenna 14a according to a signal obtained by encoding writing data. The RFID tag 4 reflects and absorbs received radio waves by changing an impedance of an antenna 6 (refer to FIG. 2) built therein. The reader/writer 14 receives the reflected waves from the RFID tag 4 with the antenna 14a and demodulates the received waves to obtain data received from the RFID tag 4.

The print head 15 is connected to a print head driver 16. The print head driver 16 drives the print head 15 to perform printing on the printing surface (in the present embodiment, a surface opposite to a surface to which the RFID tag 4 is attached) of the label paper 3 (refer to FIG. 2) attached to the label mount 2 conveyed on the platen roller 12.

The reader/writer 14 and the print head driver 16 are connected to a controller 17, respectively. In addition, an operation panel 18, a communication interface 19, a motor 20 and a sensor signal input section 21 are connected to the controller 17.

The operation panel 18 has an interface function for a user. The communication interface 19 has an interface function for a host device. The RFID printer device 1 receives data to be written to the RFID tag 4 and data to be printed on the label paper 3 from the host device via the communication interface 19.

The motor 20 drives the platen roller 12 to rotate counterclockwise. Through the rotation, the label mount 2 is conveyed in the direction indicated by the arrow C.

Signals from various sensors including the mark sensor 13 are input to the sensor signal input section 21. The various sensors include an opening and closing sensor (not shown) and the like for detecting opening and closing of a member such as a cover, a door, a lip or the like that is opened or closed at the time of replacement of the label mount 2.

(Description of the Configuration of the Label Mount)

Figure 2:
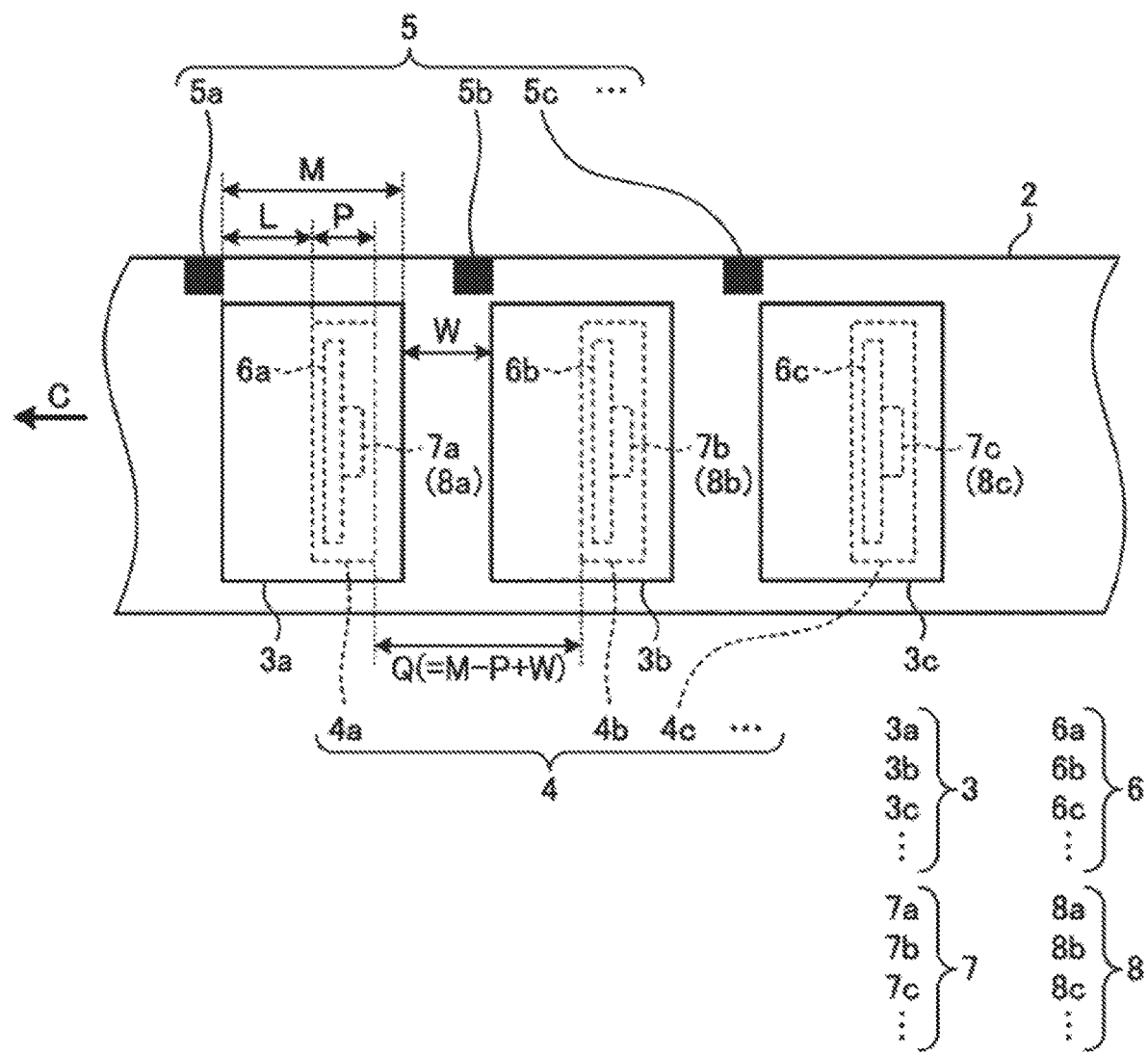
FIG. 2 is an external view illustrating an example of an RFID tag formed on a label paper attached to a label mount.
Figure 3:
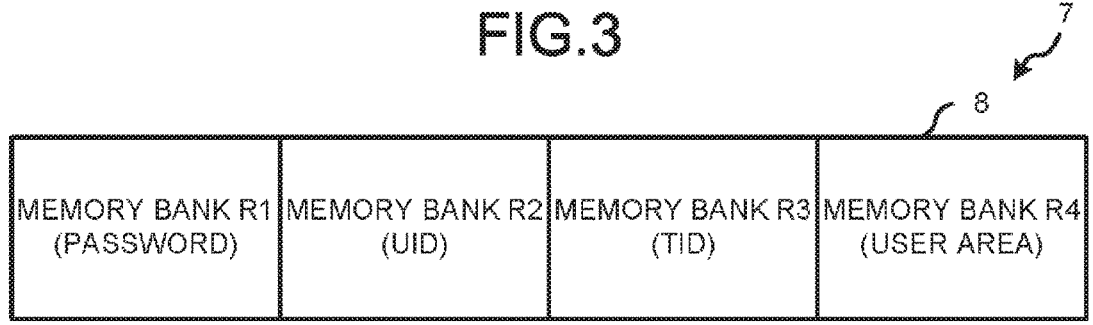
FIG. 3 is a schematic view illustrating an example of a configuration of a memory included in the RFID tag.

Next, the configuration of the label mount 2 is described with reference to FIG. 2 and FIG. 3. FIG. 2 is an external view illustrating an example of RFID tags 4 (4a, 4b, 4c, . . . ) formed on the label papers 3 (3a, 3b, 3c, . . . ) attached to the label mount 2. FIG. 3 is a schematic view illustrating an example of the configuration of a memory 8 (8a, 8b, 8c, . . . ) in the RFID tag 4 (4a, 4b, 4c, . . . ).

On the surface of the label mount 2, a plurality of label papers 3 (3a, 3b, 3c, . . . ) having the same rectangular shape is attached at a constant label interval W in a longitudinal direction of the label mount 2 (conveyance direction) in a line. The RFID tag 4 (4a, 4b, 4c, . . . ), which is a wireless communication medium, is formed on an adhesion surface side of the label paper 3 with respect to the label mount 2. The RFID tags 4 all have the same shape and configuration, and the antennas 6 (6a, 6b, 6c, . . . ) and IC (Integrated Circuit) chips 7 (7a, 7b, 7c, . . . ) are built therein.

The antenna 6 (6a, 6b, 6c, . . . ) receives radio waves emitted from the outside of the RFID tag 4. The antenna 6 (6a, 6b, 6c, . . . ) emits response signals as a response to the received radio waves towards the outside of the RFID tag 4.

The IC chip 7 (7a, 7b, 7c, . . . ) has a drive circuit for the RFID tag 4 and the memory 8 (8a, 8b, 8c, . . . ). The drive circuit generates an electromotive force with electromagnetic induction by radio waves received by the RFID tag 4 to operate the RFID tag 4. Specifically, the RFID tag 4 is a passive tag having no battery. The memory 8 stores information relating to the RFID tag 4 as described below (refer to FIG. 3).

The position where the RFID tag 4 is formed on the label paper 3 is predetermined for each label paper 3. The position where the label paper 3 is attached to the label mount 2 is predetermined for each label paper 3. Specifically, as shown in FIG. 2, in the label paper 3 having a label length M, the RFID tag 4 having a tag length P is formed at a distance L from a tip side (downstream side in the direction indicated by the arrow C) of the label paper 3. The label papers 3 are attached to the label mount 2 at a constant label interval W along the direction indicated by the arrow C. In other words, two adjacent RFID tags 4 are arranged at a constant tag interval Q (=M−P+W).

The RFID tag 4 is formed in such a manner that the longitudinal direction of the antenna 6 is orthogonal to the direction indicated by the arrow C which is the conveyance direction of the label mount 2. On the back surface side of the label mount 2 (the surface opposite to the print head 15), the above-described black mark 5 (5a, 5b, 5c, . . . ) is arranged at a position corresponding to a leading edge position of the label paper 3 (position of the downstream edge in the conveyance direction).

The memory 8 in the IC chip 7 is divided into four rewritable memory banks R1 to R4, as shown in FIG. 3. The memory bank R1 stores password data. The memory bank R2 stores a unique ID (UID) that can be uniquely set for each RFID tag 4 to identify the RFID tag 4 attached to the label paper 3. The memory bank R3 (TID) stores a unique ID commonly set for all the RFID tags 4 of the label papers 3 attached to the label mount 2 to identify the label mount 2 and a serial number that is different for individual RFID tag 4. The memory bank R4 is a user area, and the user can freely store unique data in the memory bank R4.

After the RFID printer device 1 writes predetermined information to the RFID tag 4 and prints predetermined information on the label paper 3, the label paper 3 is peeled off from the label mount 2 to be attached to a commodity or the like.

(Description of the Hardware Structure of the RFID Printer Device)

Figure 4:
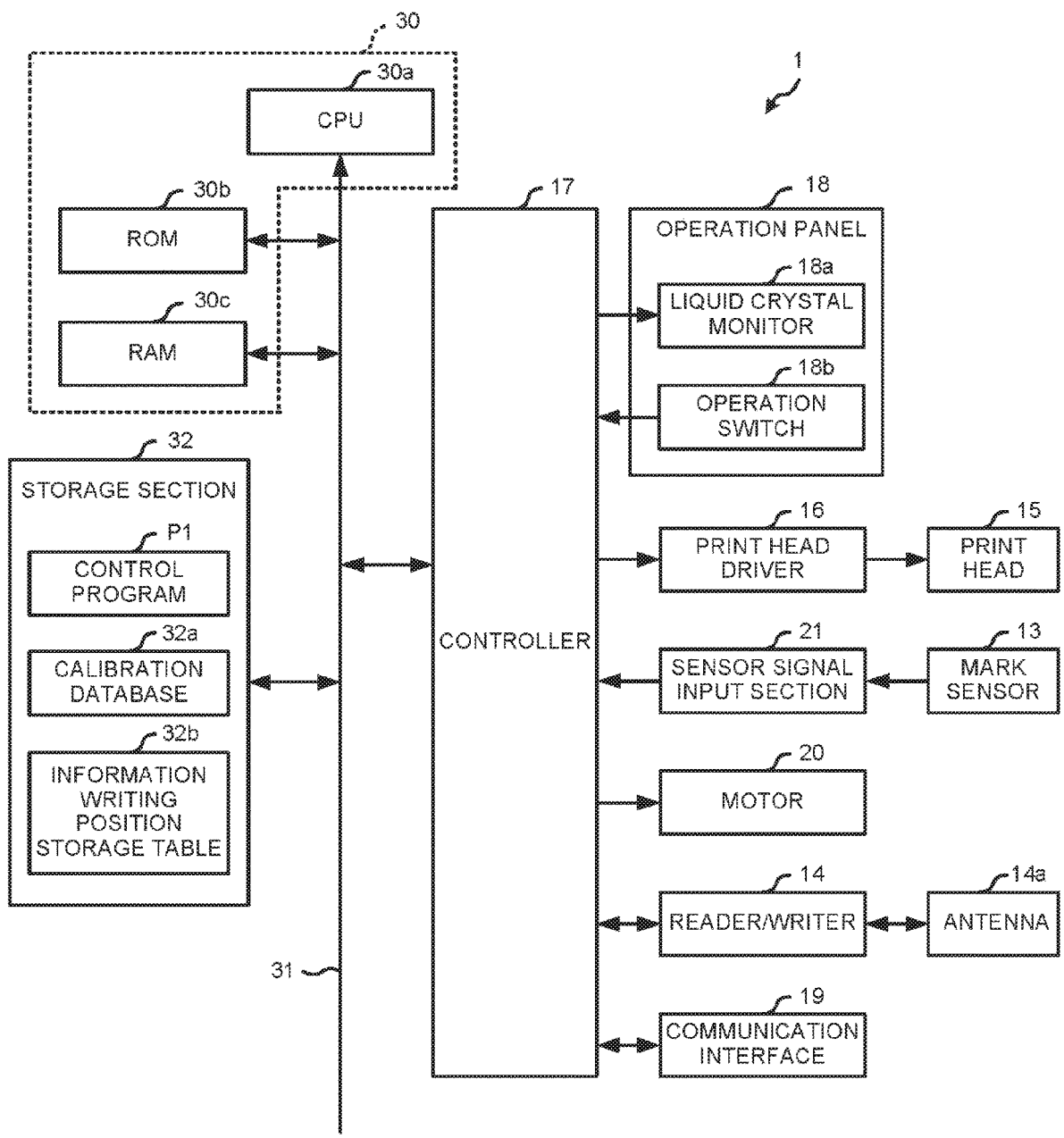
FIG. 4 is a hardware block diagram illustrating an example of a hardware structure of the RFID printer device.

Next, the hardware structure of the RFID printer device 1 is described with reference to FIG. 4. FIG. 4 is a hardware block diagram illustrating an example of the hardware structure of the RFID printer device 1. As shown in FIG. 4, the RFID printer device 1 includes a control section 30, a storage section 32 and the controller 17.

The control section 30 has a general computer configuration including a CPU (Central Processing Unit) 30*a*, a ROM (Read Only Memory) 30*b* and a RAM (Random Access Memory) 30*c*. The CPU 30*a* reads out various programs, data files and the like stored in the ROM 30*b* and the storage section 32 described below, and copies or decompresses them on the RAM 30*c*. The CPU 30*a* operates according to various programs, data files, and the like copied or decompressed on the RAM 30*c* to control the entire RFID printer device 1.

The control section 30 is connected to the storage section 32 and the controller 17 via an internal bus 31.

The storage section 32 retains stored information even when a power supply thereof is turned off. The storage section 32 is an HDD (Hard Disk Drive). The storage section 32 is a non-volatile memory such as a flash memory instead of the HDD. The storage section 32 stores programs including a control program P1. The control program P1 is used to perform functions of the RFID printer device 1. The control program P1 may be incorporated into the ROM 30*b* to be provided. The control program P1 may be recorded in a computer-readable recording medium such as a CD-ROM (Compact Disc Read-Only Memory), a FD (Flexible Disk), a CD-R (Compact Disk Recordable), a DVD (Digital Versatile Disk) and the like in the form of installable or executable file to be provided to the control section 30. Furthermore, the control program P1 may be provided by being stored in a computer connected with a network such as the Internet and downloaded via the network. The control program P1 may be provided or distributed via the network such as the Internet.

The storage section 32 further stores a calibration database 32*a* and an information writing position storage table 32*b*.

The calibration database 32*a* stores data acquired by performing calibration for determining an appropriate position when writing the information to the RFID tag 4. Specifically, the calibration database 32*a* stores a position on the label mount 2, a unique ID (UID which is a unique ID written in advance to each RFID tag 4 or a serial number in the TID area) of the RFID tag 4 returning the response signal and output of the response signal for each conveyance position of the label mount 2 and the wireless output value transmitted from the antenna 14*a*. When a plurality of RFID tags 4 returns the response signals, the calibration database 32*a* collectively stores information relating to the plurality of RFID tags 4.

The information writing position storage table 32*b* includes a writing position of information, a wireless output value at the time of writing the information, and a threshold value for discriminating between the response signal from the RFID tag 4 which is a writing target and a response signal from an RFID tag 4 which is not the writing target, which are obtained from the result of calibration. The writing position of the information is stored, for example, as an amount corresponding to a distance from the black mark 5 described above to the writing position of the information.

The controller 17 connects the control section 30 to an input/output device that performs various settings and operation control of the RFID printer device 1. Specifically, the controller 17 is connected to the operation panel 18, the print head driver 16 (print head 15), the sensor signal input section 21 (mark sensor 13), the motor 20, the reader/writer 14 (antenna 14*a*) and the communication interface 19.

The operation panel 18 includes a liquid crystal monitor 18*a* and an operation switch 18*b*. The liquid crystal monitor 18*a* displays a display screen based on an instruction from the control section 30. The operation switch 18*b* detects operation information from an operator and transmits it to the control section 30.

The functions of other input/output devices are as described above.

(Description of Functional Components of the RFID Printer Device)

Figure 5:
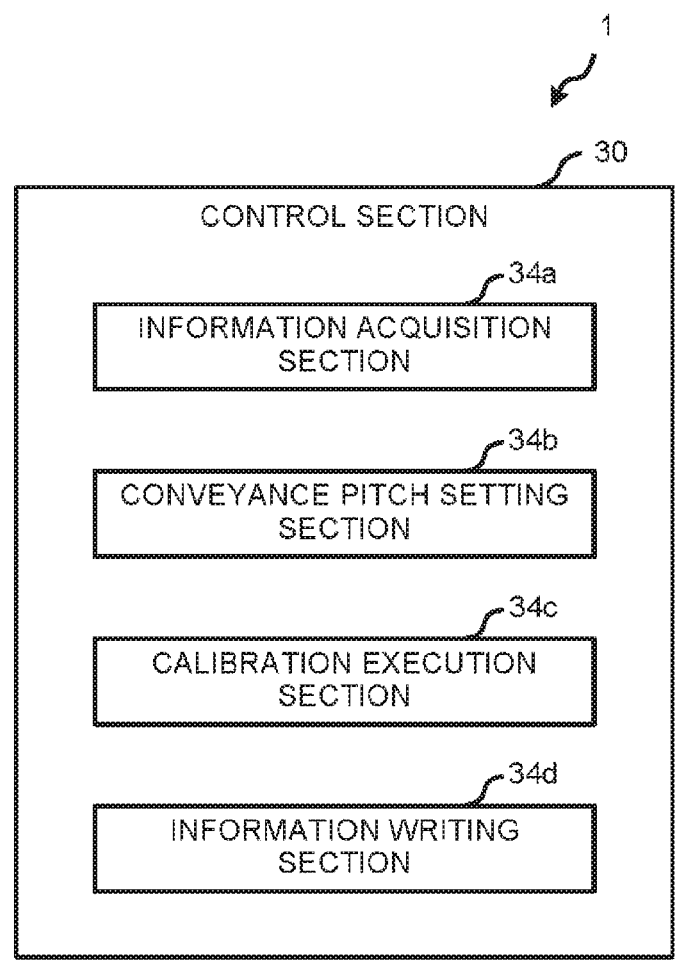
FIG. 5 is a functional block diagram illustrating an example of functional components of the RFID printer device.

Next, the functional components of the RFID printer device 1 are described with reference to FIG. 5. FIG. 5 is a functional block diagram illustrating an example of the functional components of the RFID printer device 1.

As shown in FIG. 5, the control program P1 is executed by the RFID printer device 1 to generate an information acquisition section 34*a*, a conveyance pitch setting section 34*b*, a calibration execution section 34*c* and an information writing section 34*d*. As actual hardware, the CPU 30*a* reads out the control program P1 from the storage section 32, copies or decompresses it on the RAM 30*c* and executes it to generate respective components shown in FIG. 5 in the control section 30.

The information acquisition section 34*a* acquires the label length M in the conveyance direction (the direction indicated by the arrow C) of the label paper 3 attached to the label mount 2, the tag length P in the conveyance direction (the direction indicated by the arrow C) of the RFID tag 4, and the label interval W between the plurality of the label papers 3*a*, 3*b*, 3*c*, . . . . Specifically, the information acquisition section 34*a* acquires information indicating an arrangement state of the RFID tag 4 in the label paper 3 and information indicating an arrangement state of the label paper 3 on the label mount 2, which are input by the operator, from the operation switch 18*b* of the operation panel 18 or an external device such as a PC (Personal Computer) connected to the RFID printer device 1. The information indicating the arrangement state of the RFID tag 4 in the label paper 3 includes, for example, the label length M and the tag length P. The information indicating the arrangement state of the label paper 3 on the label mount 2 is, for example, the label interval W. The information acquisition section 34*a* is an example of an information acquisition module.

The conveyance pitch setting section 34*b* sets a conveyance pitch p for conveyance of the label mount 2, based on the information indicating the arrangement state of the label paper 3 attached to the label mount 2. For example, based on the information indicating the arrangement state of the RFID tag 4 in the label paper 3 and the information indicating the arrangement state of the label paper 3 on the label mount 2, the conveyance pitch p for conveyance of the label mount 2 is set. More specifically, the conveyance pitch setting section 34*b* calculates the tag interval Q between two adjacent RFID tags 4 based on the label length M, the tag length P and the label interval W. Then, the conveyance pitch setting section 34*b* sets the conveyance pitch p for conveyance of the label mount 2 based on the tag interval Q. The conveyance pitch setting section 34*b* is an example of a setting module.

The conveyance pitch setting section 34*b* sets the conveyance pitch p according to the tag interval Q. Specifically, the larger the tag interval Q is, the larger the conveyance pitch p becomes. For example, when the tag interval Q is less than 20 mm, p=1 mm; when the tag interval Q is equal to or larger than 20 mm and less than 30 mm, p=2 mm; and when the tag interval Q is equal to or larger than 30 mm, p=3 mm.

The operator who operates the RFID printer device 1 may visually confirm the arrangement states of the label paper 3 attached to the label mount 2 and the RFID tag 4, and directly input a conveyance pitch p for conveyance of the label mount 2 using the operation switch 18b or an external device such as the PC connected to the RFID printer device 1. In this case, the information acquisition section 34a also has the function of the conveyance pitch setting section 34b.

The calibration execution section 34c conveys the label mount 2 by the conveyance pitch p set by the conveyance pitch setting section 34b, and determines the writing position of the information to the RFID tag 4, the wireless output value at the time of writing the information, and the threshold value for discriminating between the response signal from the RFID tag 4 which is a writing target for the wireless output value and the response signal from the RFID tag 4 which is not the writing target. The calibration execution section 34c is an example of a calibration module.

The calibration execution section 34c determines the above-described information on condition that a response signal exceeding a predetermined value is acquired from the RFID tag 4 which is the writing target and a threshold value capable of reliably distinguishing that response signal from a response signal transmitted from the adjacent RFID tag 4 can be set.

The information writing section 34d writes information according to the wireless output value determined by the calibration execution section 34c at the writing position determined by the calibration execution section 34c. The information writing section 34d is an example of a writing module.

(Description of a Flow of Processing Performed by the RFID Printer Device)

Figure 6:
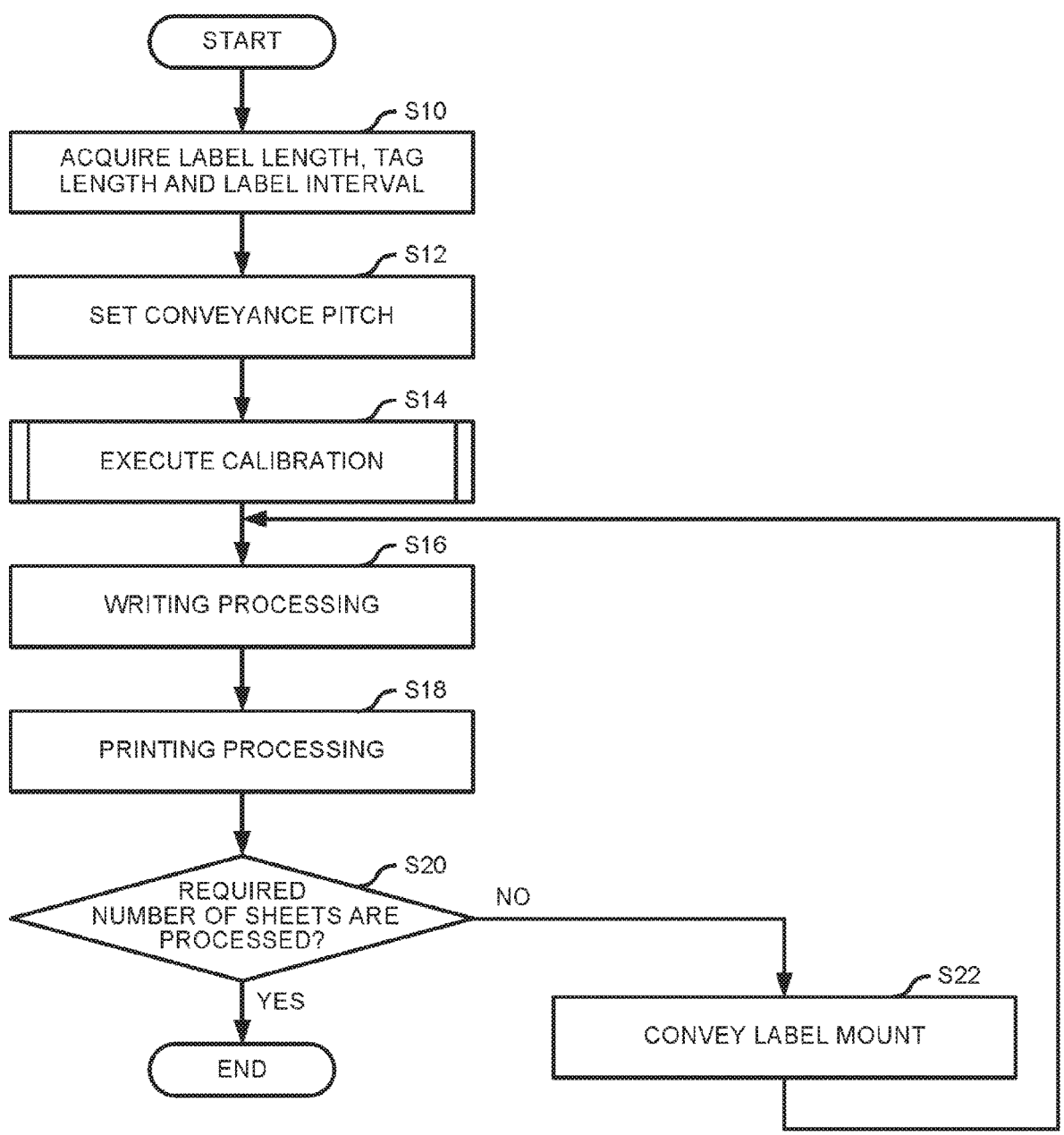
FIG. 6 is a flowchart depicting an example of a flow of a series of processing performed by the RFID printer device according to the first embodiment.

Next, the flow of the processing performed by the RFID printer device 1 is described with reference to FIG. 6. FIG. 6 is a flowchart depicting an example of a flow of a series of processing performed by the RFID printer device 1 according to the first embodiment.

First, the information acquisition section 34a acquires the label length M of the label paper 3, the tag length P of the RFID tag 4 and the label interval W between the plurality of the label papers 3 (Act S10). Specifically, the information acquisition section 34a acquires the label length M, the tag length P and the label interval W in the RFID printer device 1 based on the input from the operation switch 18b or the external device such as the PC connected to the RFID printer device 1.

The conveyance pitch setting section 34b sets a conveyance pitch p for conveyance of the label mount 2 (Act S12). Specifically, the conveyance pitch setting section 34b calculates the tag interval Q between two adjacent RFID tags 4 based on the label length M, the tag length P and the label interval W. Then, the conveyance pitch setting section 34b sets the conveyance pitch p based on the calculated tag interval Q.

Next, the calibration execution section 34c executes calibration (Act S14). The calibration execution section 34c performs the calibration to determine the writing position of the information to the RFID tag 4, the wireless output value at the time of writing the information, and the threshold value for discriminating between the response signal from the RFID tag 4 which is the writing target and the response signal from the RFID tag 4 which is not the writing target. The specific execution procedures of the calibration are described in detail below (refer to FIG. 7).

The information writing section 34d performs a writing processing to write the information at the writing position determined by the calibration execution section 34c according to the wireless output value determined by the calibration execution section 34c (Act S16). The information writing section 34d calculates the writing position on the RFID tag 4 from the position of the edge of the label paper 3 detected based on the output from the mark sensor 13 and the writing position of the information on the RFID tag 4 determined by the calibration execution section 34c.

Next, the RFID printer device 1 performs a printing processing for printing predetermined information on the label paper 3 (Act S18).

Then, the RFID printer device 1 determines whether a required number of sheets of the label papers 3 are processed (whether the information is written to the RFID tag 4 and printed on the label paper 3) (Act S20). If it is determined that the required number of sheets of the label papers 3 are processed (Yes in Act S20), the RFID printer device 1 terminates the processing shown in FIG. 6. On the other hand, if it is determined that the required number of sheets of the label papers 3 are not yet processed (No in Act S20), the flow proceeds to the processing in Act S22.

If No is taken in the determination in Act S20, in Act S22, the information writing section 34d conveys the label mount 2 to write the information to a next RFID tag 4 (Act S22). Thereafter, the flow returns to the processing in Act S16 to repeat the above-described processing in the same manner as described above.

(Description of a Flow of Calibration Performed by the RFID Printer Device)

Figure 7:
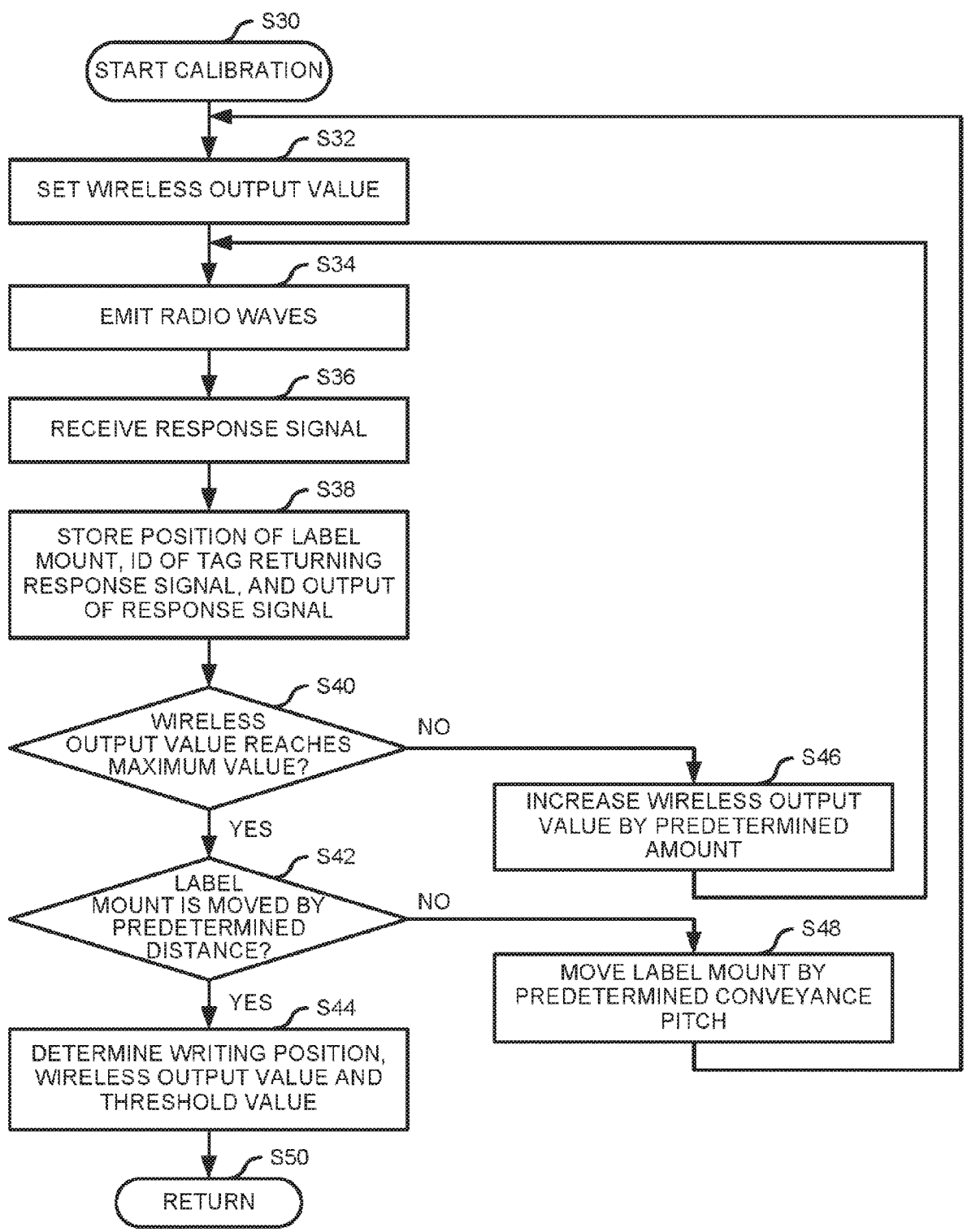
FIG. 7 is a flowchart depicting an example of a flow of calibration performed by the RFID printer device according to the first embodiment.

Next, the flow of the calibration performed by the RFID printer device 1 is described with reference to FIG. 7. FIG. 7 is a flowchart depicting an example of the flow of the calibration performed by the RFID printer device 1 according to the first embodiment. All of the processing shown in FIG. 7 is performed by the calibration execution section 34c.

The calibration execution section 34c starts the calibration since Act S30. First, the calibration execution section 34c sets the wireless output value transmitted from the antenna 14a to an initial value (Act S32).

The calibration execution section 34c controls the reader/writer 14 to radiate the radio wave corresponding to the wireless output value set in Act S32 (or Act S46 described below) from the antenna 14a (Act S34).

Furthermore, the calibration execution section 34c controls the reader/writer 14 to receive the response signal from the RFID tag 4 with the antenna 14a (Act S36).

The calibration execution section 34c stores the position (conveyance position) of the label mount 2 and the unique ID (UID which is a unique ID written in advance to each RFID tag 4 or a serial number in the TID area) of the RFID tag 4 from which the response signal is returned, and the output of the response signal (the wireless output value such as a RSSI value) in the calibration database 32a (Act S38). When a plurality of RFID tags 4 returns response signals, all the above-described information relating to each of the plurality of RFID tags 4 is stored.

The calibration execution section 34c determines whether the wireless output value transmitted from the antenna 14a reaches the maximum value (Act S40). If it is determined that the wireless output value transmitted from the antenna 14a reaches the maximum value (Yes in Act S40), the flow proceeds to the processing in Act S42. On the other hand, if it is determined that the wireless output value transmitted from the antenna 14a does not reach the maximum value (No in Act S40), the flow proceeds to the processing in Act S46.

If No is taken in the determination in Act S40, in Act S46, the calibration execution section 34c increases the wireless output value transmitted from the antenna 14a by a predetermined amount. Thereafter, the flow proceeds to the processing in Act S34 to repeat the above-described processing in the same manner as described above.

On the other hand, if Yes is taken in the determination in Act S40, in Act S42, the calibration execution section 34c determines whether the label mount 2 is moved by a predetermined distance, i.e., by a distance necessary to perform the calibration. If it is determined that the label mount 2 is moved by a predetermined distance (Yes in Act S42), the flow proceeds to the processing in Act S44. On the other hand, if it is determined that the label mount 2 is not moved by the predetermined distance (No in Act S42), the flow proceeds to the processing in Act S48. The calibration execution section 34c conveys the label mount 2 at least by a distance of M+W, i.e., at least by a distance containing the label length M of one label paper 3 and the label interval W between the two adjacent label papers 3 at the time of the calibration.

If No is taken in the determination in Act S42, in Act S48, the calibration execution section 34c moves the label mount 2 only by the conveyance pitch p set in Act S12 described above. Thereafter, the flow proceeds to the processing in Act S32 to repeat the above-described processing in the same manner as described above.

On the other hand, if Yes is taken in the determination in Act S42, the calibration execution section 34c determines the writing position of the information to the RFID tag 4, the wireless output value at the time of writing the information, and the threshold value for discriminating between the response signal from the RFID tag 4 which is the writing target and the response signal from the RFID tag 4 which is not the writing target. Then, the calibration execution section 34c stores the determination result in the information writing position storage table 32b.

The calibration execution section 34c terminates the calibration and then proceeds to the processing in Act S16 in FIG. 6 (Act S50).

In the above description, the information acquisition section 34a acquires the information indicating the arrangement state of the RFID tag 4 in the label paper 3 and the information indicating the arrangement state of the label paper 3 on the label mount 2, and the conveyance pitch setting section 34b sets the conveyance pitch p based on the tag interval Q calculated based on the information acquired by the information acquisition section 34a; however, it is not limited thereto. For example, the conveyance pitch setting section 34b may set the conveyance pitch p based on the label interval W. In this case, the information acquisition section 34a needs to acquire at least the label interval W in the RFID printer device 1 based on the input from the operation switch 18b or the external device such as the PC connected to the RFID printer device 1 as described above. In this case, the information acquisition section 34a may acquire the label interval W in advance from the optical sensor such as the mark sensor 13 by conveying the label mount 2 before performing the calibration processing described above.

Second Embodiment

Hereinafter, a second embodiment of the wireless tag writing device is described in detail with reference to the accompanying drawings. The second embodiment described below is an example in which the wireless tag writing device of the present invention is an RFID printer device 1a. In particular, the RFID printer device 1a shown in the second embodiment has a function of measuring layouts of the label paper 3 attached to the label mount 2 and the RFID tag 4 before calibration, and setting the conveyance pitch p for conveyance of the label mount 2 at the time of the calibration based on the measurement result.

The RFID printer device 1a has substantially the same hardware structure as the RFID printer device 1. Therefore, among the constituent elements and functional components of the RFID printer device 1a, the same or similar elements as those of the RFID printer device 1 are denoted with the same reference numerals as used in the first embodiment.

The RFID printer device 1a includes an image sensor 13a (not shown) instead of the mark sensor 13 described in the first embodiment. The image sensor 13a is, for example, a camera provided with a sensor such as a CCD (Charge Coupled Device) sensor or a CMOS (Complementary Metal Oxide Semiconductor) sensor. The image sensor 13a has a function of detecting information necessary to calculate the tag interval Q, i.e., the information including the position of the label paper 3, the position of the RFID tag 4 and the label interval W from an image obtained by capturing the label mount 2 by an existing image processing method, in addition to the function of the mark sensor 13 for detecting the position of the black mark 5.

(Description of Functional Components of the RFID Printer Device)

Figure 8:
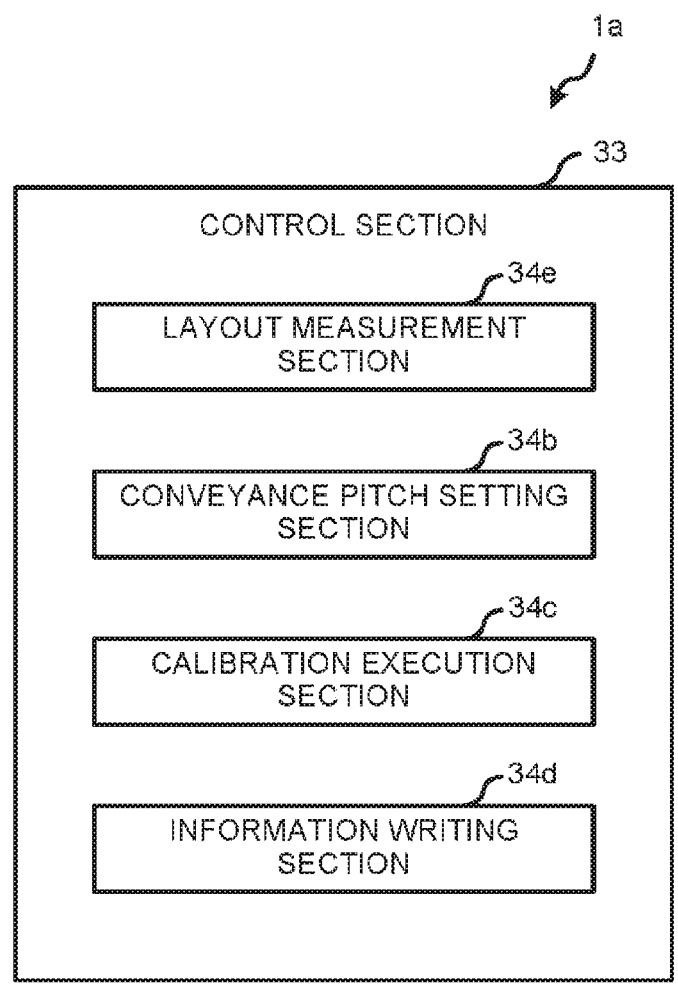
FIG. 8 is a functional block diagram illustrating an example of functional components of a RFID printer device according to a second embodiment.

The functional components of the RFID printer device 1a are described with reference to FIG. 8. FIG. 8 is a functional block diagram illustrating an example of the functional components of the RFID printer device 1a according to the second embodiment.

The RFID printer device 1a generates respective components shown in FIG. 8 in a control section 33 (not shown) (a section corresponding to the control section 30 included in the RFID printer device 1). Specifically, the control section 33 includes a layout measurement section 34e in place of the information acquisition section 34a as compared with the functional components (refer to FIG. 5) of the RFID printer device 1.

The layout measurement section 34e detects the position of the label paper 3, the position of the RFID tag 4 and the label interval W by the operation of the image sensor 13a. Then, the layout measurement section 34e calculates the label length M and the label interval W of the label paper 3 and the tag length P of the RFID tag 4 based on the detection results. The layout measurement section 34e is an example of a measurement module. Specifically, the layout measurement section 34e performs various known image processing (density analysis, edge detection, etc.) on the image of the label mount 2 captured by the image sensor 13a, and calculates the above-described values based on the result of the image processing.

(Description of a Flow of Processing Performed by the RFID Printer Device)

Figure 9:
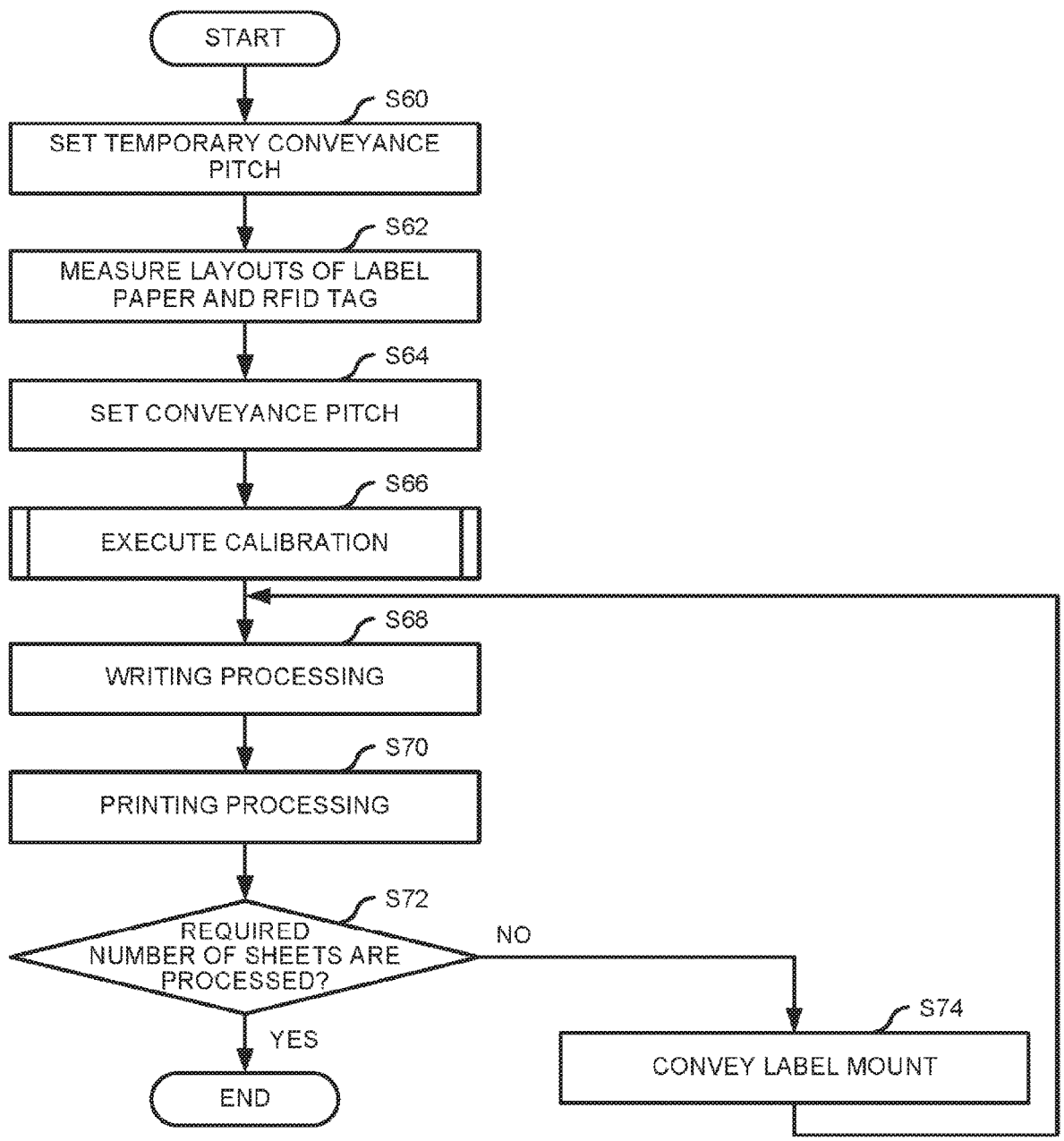
FIG. 9 is a flowchart depicting an example of a flow of a series of processing performed by the RFID printer device according to the second embodiment.

Next, the flow of the processing performed by the RFID printer device 1a is described with reference to FIG. 9. FIG. 9 is a flowchart depicting an example of a flow of a series of processing performed by the RFID printer device 1a according to the second embodiment.

In the series of processing shown in FIG. 9, Act S60 and S62 are performed instead of Act S10 included in the series of processing (refer to FIG. 6) performed by the RFID printer device 1 in the first embodiment.

In Act S60, the layout measurement section 34e sets a temporary conveyance pitch for conveyance of the label mount 2. Specifically, the layout measurement section 34e sets the conveyance pitch of the label mount 2 at the time of performing the processing in Act S62 as the temporary conveyance pitch. The temporary conveyance pitch is set to be capable of calculating the label length M, the tag length P, and the label interval W without leakage based on an observation range of the image sensor 13a and a processing speed of the image sensor 13a, for example.

Next, in Act S62, the layout measurement section 34e measures the layouts of the label paper 3 and the RFID tag 4. Specifically, the layout measurement section 34e detects, for example, the position of the label paper 3, the position of the RFID tag 4, the label interval W, and the like.

Specifically, the layout measurement section 34e automatically measures the layouts of the label paper 3 and the RFID tag 4, which are input from the operation switch 18b by the operator of the RFID printer device 1 in the first embodiment, by executing the image processing on the output from the image sensor 13a.

Then, in Act S64, after the conveyance pitch setting section 34b sets the conveyance pitch p for conveyance of the label mount 2 based on the measurement result from the layout measurement section 34e, the processing subsequent to that in Act S66 is performed in the same manner as described above. The processing subsequent to that in Act S66 is the same as the processing subsequent to that in Act S14 in FIG. 6.

As described above, in the RFID printer device 1 (wireless tag writing device) according to the above-described embodiments, the calibration execution section 34c (calibration module) conveys the label mount 2 by the conveyance pitch p set by the conveyance pitch setting section 34b (setting module) based on the information including the arrangement state of a plurality of label papers 3 attached to the label mount 2, and determines the writing position of the information to the RFID tag 4 (wireless tag), the wireless output value at the time of writing the information, and the threshold value for discriminating between the response signal from the RFID tag 4 which is the writing target for the wireless output value and the response signal from the RFID tag 4 which is not the writing target. Then, the information writing section 34d (writing module) writes the information at the writing position determined by the calibration execution section 34c according to the wireless output value determined by the calibration execution section 34c. Therefore, the RFID tag 4 with a wider tag interval Q is calibrated by a larger conveyance pitch p, and the RFID tag 4 with a narrower tag interval Q is calibrated by a smaller conveyance pitch p. In this way, the calibration operation can be performed in a short time regardless of the installation interval (tag interval Q) of the RFID tag 4.

In the RFID printer device 1 (wireless tag writing device) according to the above-described embodiments, the information acquisition section 34a (information acquisition module) acquires the label length M in the conveyance direction of the label paper 3, the tag length P in the conveyance direction of the RFID tag 4, and the label interval W between the plurality of the label papers 3. Then, the conveyance pitch setting section 34b (setting module) sets the conveyance pitch p of the label mount 2 based on the information acquired by the information acquisition section 34a. Therefore, the information relating to the layout of the RFID tag 4 can be set easily and reliably.

In the RFID printer device 1 (wireless tag writing device) according to the above-described embodiments, the conveyance pitch setting section 34b (setting module) sets the conveyance pitch p of the label mount 2 based on the tag interval Q between the adjacent RFID tags 4 calculated from the label length M, the tag length P and the label interval W. Therefore, the optimum conveyance pitch p of the label mount 2 at the time of calibration can be set according to the arrangement state of the adjacent RFID tags 4.

In the RFID printer device 1a (wireless tag writing device) according to the above-described embodiments, the layout measurement section 34e (measurement module) measures the label length M in the conveyance direction (the direction indicated by the arrow C) of the label paper 3, the tag length P in the conveyance direction of the RFID tag 4, and the label interval W between the plurality of the label papers 3 while conveying the label mount 2. Therefore, it is possible to automatically acquire the information relating to the layouts of the label paper 3 and the RFID tag 4 necessary to set the conveyance pitch p of the label mount 2.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A wireless tag writing device, which writes predetermined information to wireless tags respectively formed on a plurality of label papers attached to a label mount while conveying the wireless tags, comprising:
  a setting module configured to set a conveyance pitch for conveyance of the label mount based on information including an arrangement state of the plurality of label papers attached to the label mount;
  a calibration module configured to convey the label mount by the conveyance pitch set by the setting module and to determine a writing position of information to the wireless tags, a wireless output value at the time of writing the information, and a threshold value for discriminating between a target response signal from a wireless tag which is a writing target for the wireless output value and a non-target response signal from a wireless tag which is not the writing target; and
  a writing module configured to write the information at the writing position determined by the calibration module according to the wireless output value determined by the calibration module.

2. The wireless tag writing device according to claim 1, further comprising:
  an information acquisition module configured to acquire a label length in a conveyance direction of the label papers, a tag length in a conveyance direction of the wireless tag and a label interval between two adjacent label papers of the plurality of the label papers, wherein
  the setting module sets the conveyance pitch based on the information acquired by the information acquisition module.

3. The wireless tag writing device according to claim 2, wherein
  the setting module sets the conveyance pitch based on a tag interval between adjacent wireless tags calculated from the label length, the tag length, and the label interval.

4. The wireless tag writing device according to claim 1, further comprising:
a measurement module configured to measure a label length in a conveyance direction of the label papers, a tag length in a conveyance direction of the wireless tags, and a label interval between two adjacent label papers of the plurality of label papers while conveying the label mount, wherein
the setting module sets the conveyance pitch based on measurement result from the measurement module.

5. The wireless tag writing device according to claim 4, wherein
the setting module sets the conveyance pitch based on a tag interval between adjacent wireless tags calculated from the label length, the tag length, and the label interval.

6. The wireless tag writing device according to claim 1, wherein
a calibration database stores data acquired by performing a calibration of a position on the label mount, a unique identifier (UID) of the wireless tag.

7. The wireless tag writing device according to claim 1, wherein
the calibration module comprises an optical sensor.

8. The wireless tag writing device according to claim 1, wherein
the writing module comprises a printing head.

9. The wireless tag writing device according to claim 1, wherein
the wireless tag writing device is a radio frequency identification printing device.

10. A method by a wireless tag writing device, comprising:
setting a conveyance pitch for conveyance of a label mount based on information including an arrangement state of a plurality of label papers attached to the label mount;
conveying the label mount by the set conveyance pitch and determining a writing position of information to the wireless tag, a wireless output value at the time of writing the information, and a threshold value for discriminating between a target response signal from the wireless tag which is a writing target for the wireless output value and a non-target response signal from a wireless tag which is not the writing target; and
writing predetermined information to the plurality of wireless tags formed on the plurality of label papers at the determined writing position according to the determined wireless output value.

11. The method according to claim 10, further comprising:
acquiring a label length in a conveyance direction of the label papers, a tag length in a conveyance direction of the wireless tag and a label interval between two adjacent label papers of the plurality of the label papers, and
setting the conveyance pitch based on information acquired.

12. The method according to claim 11, wherein
setting comprises setting the conveyance pitch based on a tag interval between adjacent wireless tags calculated from the label length, the tag length, and the label interval.

13. The method according to claim 10, further comprising:
measuring a label length in a conveyance direction of the label papers, a tag length in a conveyance direction of the wireless tags, and a label interval between two adjacent label papers of the plurality of the label papers while conveying the label mount, and
setting the conveyance pitch based on a measurement result from measuring.

14. The method according to claim 13, wherein
setting comprises setting the conveyance pitch based on a tag interval between adjacent wireless tags calculated from the label length, the tag length, and the label interval.

15. The method according to claim 10, wherein
the wireless tag writing device is a radio frequency identification printing device.

* * * * *